United States Patent [19]

Tolan

[11] 4,076,624
[45] Feb. 28, 1978

[54] SELF-DEPLOYING BOOM
[75] Inventor: Peter John Tolan, Scituate, Mass.
[73] Assignee: The B. F. Goodrich Company, Akron, Ohio
[21] Appl. No.: 763,400
[22] Filed: Jan. 28, 1977
[51] Int. Cl.² ......................................... E02B 15/04
[52] U.S. Cl. ................................ 210/96 R; 61/1 F; 210/242 S; 210/DIG. 25
[58] Field of Search ............... 61/1 F; 210/96 R, 97, 210/242 S, DIG. 25

[56] References Cited
U.S. PATENT DOCUMENTS

| 2,968,928 | 1/1961 | Wicklander | 61/1 F |
| 3,321,923 | 5/1967 | Smith et al. | 210/DIG. 25 |
| 3,670,814 | 6/1972 | Childers | 61/1 F X |
| 3,783,622 | 1/1974 | Gambel | 61/1 F |

FOREIGN PATENT DOCUMENTS

| 2,051,711 | 5/1971 | Germany | 61/1 F |

*Primary Examiner*—Charles N. Hart
*Assistant Examiner*—Robert H. Spitzer
*Attorney, Agent, or Firm*—Joseph Januszkiewicz

[57] ABSTRACT

A current deployable floatable boom unit for accumulating oil from the surface of water. An oil monitoring device is operative to actuate the deployment of the boom unit when oil is sensed adjacent to the boom unit, which boom unit is stored out of the way.

8 Claims, 5 Drawing Figures

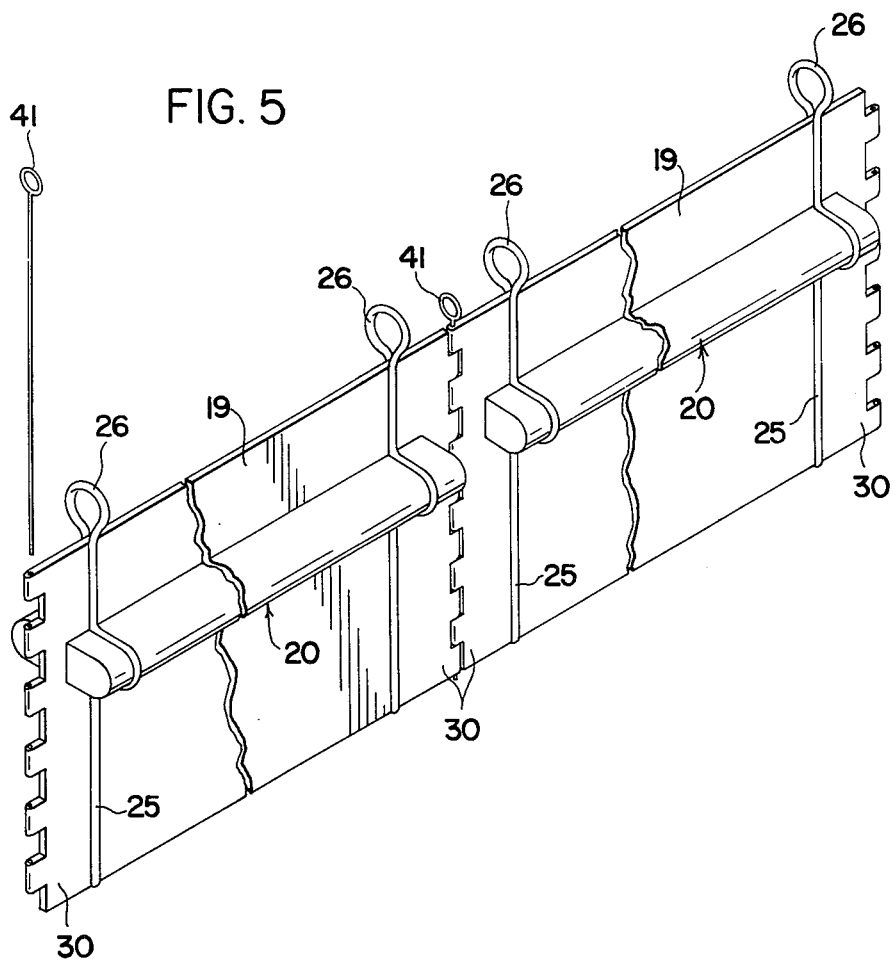

SELF-DEPLOYING BOOM

BACKGROUND OF THE INVENTION

This invention relates to an anti-pollution apparatus and more particularly to a oil spill current activated boom that is deployable to collect floatable pollutants such as oil.

The devastating effects of liquid hydrocarbons spillage on a body of water are well known. Accidental spillages of oil are ugly, dangerous, quite damaging and can severely contaminate marine life as well as shoreline property. The legal implication of such damage is great and it is essential that means be provided to control these accidental spillages. Early techniques used oil absorbent materials such as hay or straw to absorb the pollutants and then such materials were gathered, which action was a laborious task. More recent devices included floating booms which could be located around a boat that was polluting the waters. Other polluting control devices were pushed or towed through the water to collect the pollutants. The present invention provides an alternate means for controlling pollutants in those areas where oil is loaded or unloaded by tankers, barges and the like and where accidents usually take place and can cause damage. The present invention provides an effective practical means for controlling and confining oil spills on deposits on waters to prevent their subsequent spread and damage. In addition, the present invention is particularly useful in areas where water traffic prevents the permanent type of installation because the known booms were deployed in such a manner that they interfered with the use of the channel waters. The present invention is a self-deploying boom which is so stored that it does not interfere with the channel use, yet upon deployment will position itself to effectively collect and contain the oil spill.

SUMMARY OF THE INVENTION

The oil monitoring and pollutant control apparatus comprises a flexible elongated body or boom being so folded that it can be retained in a body of water by a holding line that is secured to a boat or a dock. An oil monitoring device is mounted adjacent to the holding line so that upon detection of oil, the holding line is severed and the boom is deployed. The ends of the boom are connected to mooring lines which in turn are connected to spaced mooring blocks to deploy the boom in a pre-determined attitude and locations for most effective use of containment of the pollutant material.

BRIEF DESCRIPTION OF THE DRAWINGS

FIG. 5 is an isometric view of a pair of flotatable sections connected with a section joiner.

DESCRIPTION OF PREFERRED EMBODIMENT

Figure 1:
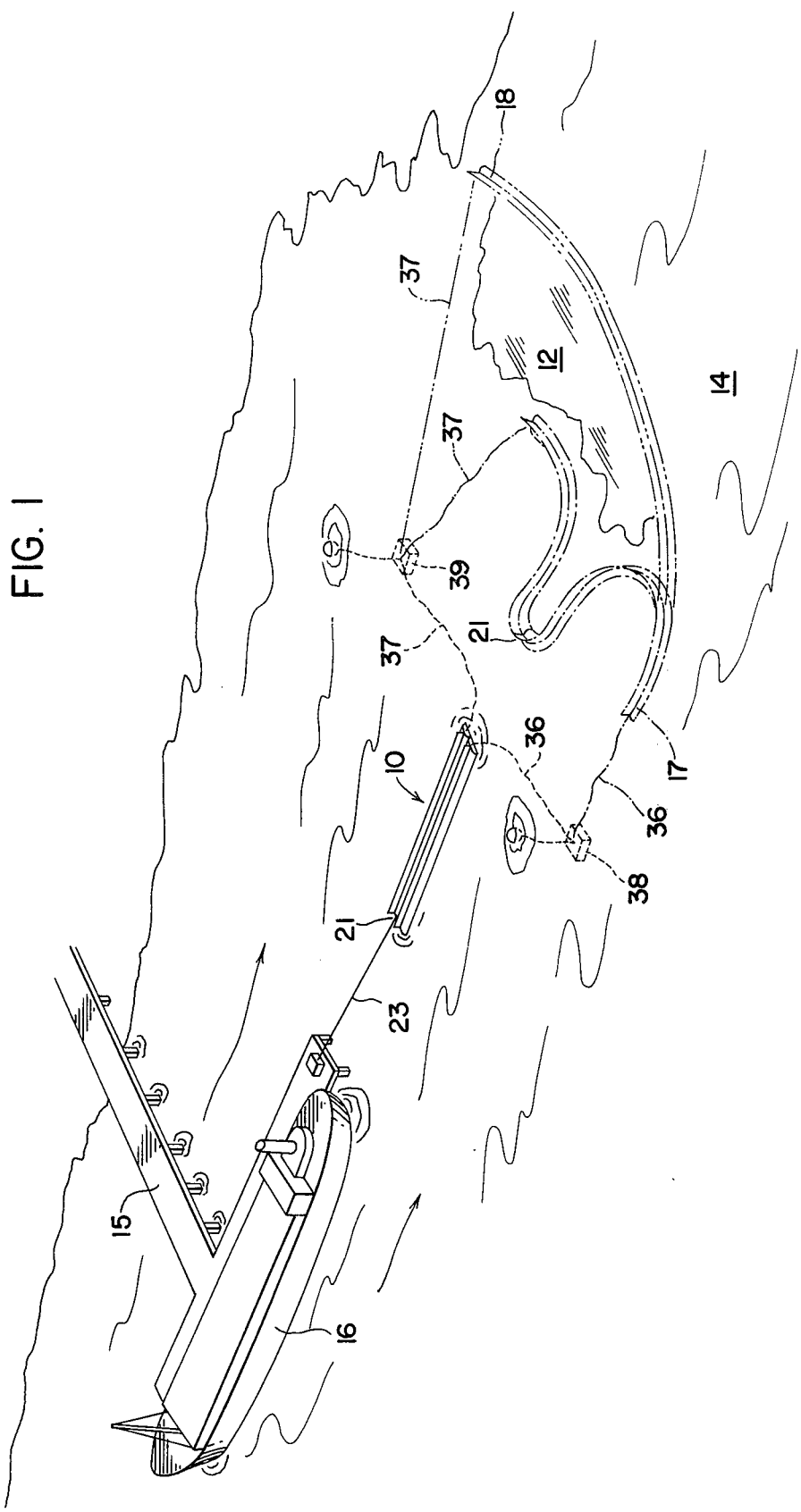
FIG. 1 is a schematic view of the invention showing the normal positions and the deployed condition in phantom lines of the oil pollutant control apparatus.
Figure 2:
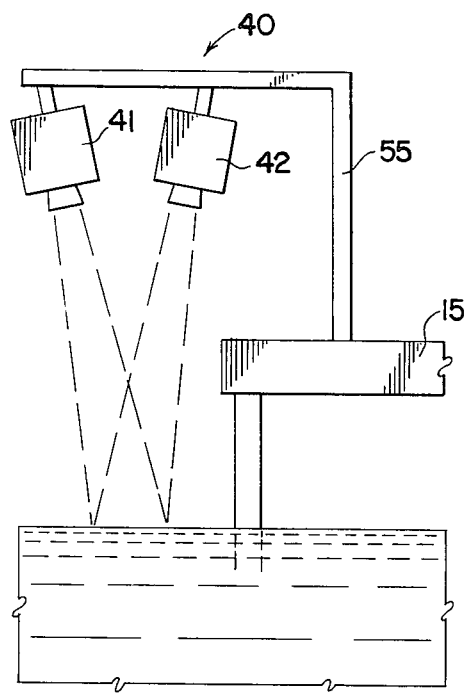
FIG. 2 is a side elevational view of an oil monitoring device.

Referring to the drawings wherein like characters designate like or corresponding parts throughout the several views, there is shown in FIG. 1 an apparatus or boom 10 for controlling a spill of liquid pollutant 12 on a body of water 14, which body of water is shown as a stream or river having a current going in the general directions indicated by the arrows. A retaining means such as dock 15 is shown as projecting into the river. An oil barge or other similar vessel 16 is moored to the dock 15.

Figure 3:
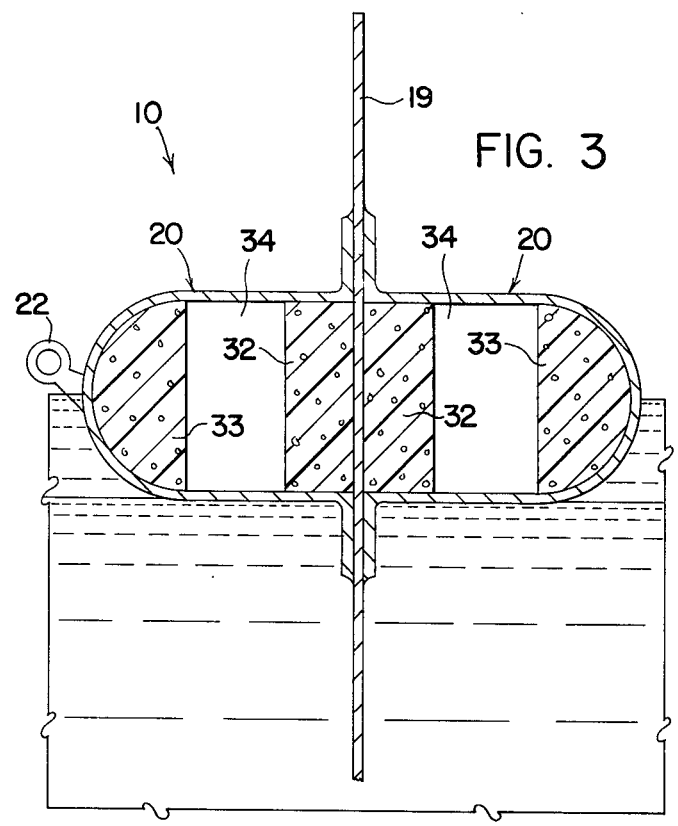
FIG. 3 is a cross sectional view of a boom deployed in a liquid.
Figure 4:
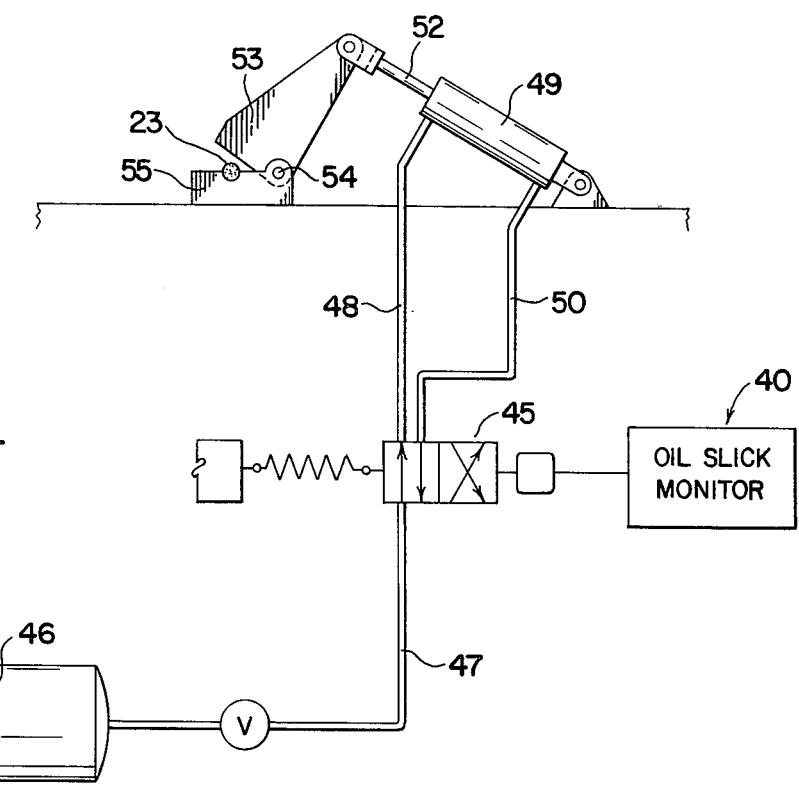
FIG. 4 is a schematic diagram of a control device for releasing the holding line of the pollutant control apparatus.

The apparatus or boom 10 for confining the oil or pollutants may be constructed of several materials and the design may be of several presently available as a series of hollow units or sections that are connected together to form a flexible elongated unit with spaced end portions 17 and 18. Depending on the length of the sections and the form of the joint connecting the sections, the confining apparatus or boom may have any desired configuration and size. As an example, a section of the boom 10 has a vertical dam 19 sandwiched between two D-shaped hollow flotation elements, generally designated 20. The overall width of each element 20 is one fourth to two-thirds the overall height of the vertical dam 19, and greater than the height of the element itself. The flotation elements 20 are substantially continuous along the full length of the barrier or boom 10 except that at the midpoint, the joint or connection 21 between the sections has greater flexibility to allow the boom 10 to form a pair of flexible elongated body portions which may be in abutting relationship for a purpose to be described. Such joint or connection 21 may have a loop 22 molded therein (FIG. 3) to receive one end of a tow or holding line 23. Suitable vertical plastic ribs 25 are located at suitable intervals along the length of the boom or barrier 10. The ribs 25 may be bonded, sealed or otherwise fastened against the dam 19 and elements 20 in order to provide a semi-rigid stiffener and body to the barrier or boom 10. The ribs 25 extend from a point at the bottom edge of one side of the dam 19 vertically upward, against the dam 19, around element 20, upward against the dam 19, over the top of dam 19 in a loop 26, downward on the opposite side of the dam 19, around element 20 and on down to the bottom edge of the dam 19 opposite the starting point. The sections of the boom may utilize boom section joiners generally designated 30 to provide a flexible quick joining and releasing method which permits the joiner of the necessary sections, however, any convenient joining means may be used. The joiner 30 utilizes a piano hinge like plastic filling which is attached to the ends of each section. There are left and right hand joiners 30 which when joined bring the sections or components closely together. A pin 41 is inserted to join closely the respective sections to prevent the oil from leaking or passing through. The sections have non-water absorbent foam pieces 32 and 33 within the outer shell which holds the foam in place. The hollow portion 34 between the foam pieces aid in the flotation, however solid foam pieces may be substituted in this construction.

The respective ends 17 and 18 of the oil confining apparatus of boom 10 are secured to one end of mooring lines 36 and 37, which lines 36 and 37 have their other ends secured to mooring blocks 38 and 39, which blocks are spaced from each other and determine in cooperation with the mooring lines 36 and 37 the configuration which the boom 10 will assume. Placement of the mooring blocks 38 and 39 closer together will permit the deployment of the boom 10 to assume a greater oval shape.

To monitor the upstream portion above the boom 10, a monitoring device 40 such as that manufactured by WRIGHT & WRIGHT, INC., Environmental Engineering of Newton Centre, Massachusetts is mounted on a suitable bracket above the water. The monitoring unit 40 includes a transmitter unit 41 which transmits a beam to the water surface to be monitored. Such beam is reflected back to a receiver unit 42 which is operative to detect a floating oil slick and provides an electrical impulse signal to a solenoid controlled valve 45.

In the normal condition, valve 45 connects pressurized tank 46 via lines 47 and 48 to the rod end of cylinder 49; however, on actuation of control valve 45 line 47 connects the pressurized tank to line 50 which is connected to the head end of cylinder 49 which extends the rod 52 to pivot the cutting arm 53 about pivot means 54 to cut the holding line 23 which passes through a notch on anvil 55, to permit the deployment of boom 10. The one end of line 23 is secured to the dock or pier 15 while the other end is secured to the middle portion 21 of the boom 10.

The control valve 45 is shown as spring biased to return it to the non-actuated position. Other suitable means may be provided to release the holding line 23 in response to a signal received from monitoring device 40. The monitoring device 40 is mounted on a bracket 55 that is suitably secured to the pier 15 to monitor the water downstream from the location where the oil barge 16 is docked.

It will be apparent that, although a specific embodiment and certain modifications of the inventions have been described in detail, the invention is not limited to the specifically illustrated and described constructions since variations may be made without departing from the principles of the invention.

I claim:

1. An apparatus for controlling a spill of liquid pollutant on a body of water having a current, comprising: a flexible elongated longitudinally extending flotatable boom, said boom having a pair of spaced ends, a tow line having a pair of ends, one end of said towline secured to one portion of said boom intermediate the ends thereof to fold said boom into a pair of parallel elongated portions by the current retaining means located upstream of said boom, the other end of said tow line secured to said retaining means to secure said boom in said folded condition, a pair of spaced mooring blocks located in said body of water, one of said ends of said boom being secured to one of said mooring blocks by a mooring line, the other one of said ends of said boom being secured to the other one of said mooring blocks, sensing means mounted on said retaining means operative to monitor for a liquid pollutant in such current and provide an output signal in response to pollutant in said current, and cutting means mounted on said retaining means operative to sever said tow line in response to said signal from said sensing means to deploy said flexible extending flotatable boom.

2. An apparatus for controlling a spill of pollutant as set forth in claim 1 wherein the overall length of said elongated boom is greater than the distance between said mooring blocks.

3. An apparatus for controlling a spill of pollutant as set forth in claim 1 wherein said tow line is secured to the center of said boom and holds said elongated portions in parallel abutting relationship.

4. An apparatus for controlling a spill of pollutants as set forth in claim 3 wherein said mooring blocks are spaced laterally from the ends of said boom in the position held by said tow line.

5. An apparatus for controlling a spill of pollutants as set forth in claim 4 wherein said sensing means is an oil monitoring device having means for scanning the liquid upstream of said boom.

6. An apparatus for entraining pollutant material on the surface of a liquid having a current comprising: a flexible elongated longitudinally extending flotatable boom, said boom having a first elongated body portion and a second body portion, said body portions being interconnected to provide a juncture and a pair of ends, said body portions providing a vertical barrier extending above and below the surface of the liquid, retaining means located upstream of said boom, a tow line having one end secured to said juncture and the other end secured to said retaining means, said tow line maintaining said body portions in adjacent relationship, a pair of spaced mooring blocks, a pair of mooring lines, one end of one of said mooring line connected to one of said mooring blocks, the other end of said one mooring line connected to one of said pair of ends of said body portions, one end of the other of said mooring lines connected to the other of said mooring blocks, the other end of said other mooring line connected to the other one of said pair of ends of said body portions, an oil monitoring device mounted on said retaining means for scanning said current and operative to provide an output signal in response to the detection of a predetermined quantity of oil in said current, and cutting means operative in response to said signal from said oil monitoring device to cut said tow line and release said flexible body portions to float downstream and be held in deployed condition by said mooring lines and said mooring blocks.

7. An apparatus for entraining pollutant material as set forth in claim 6 wherein said first and second body portions substantially equal in length.

8. An apparatus for entraining pollutants as set forth in claim 7 wherein said mooring blocks are spaced laterally from the said ends of said boom in the position held by said tow line.

* * * * *